Aug. 30, 1966 — O. L. LOOKER — 3,269,201
VARIABLE SPEED DRIVE
Filed June 5, 1964 — 2 Sheets-Sheet 1
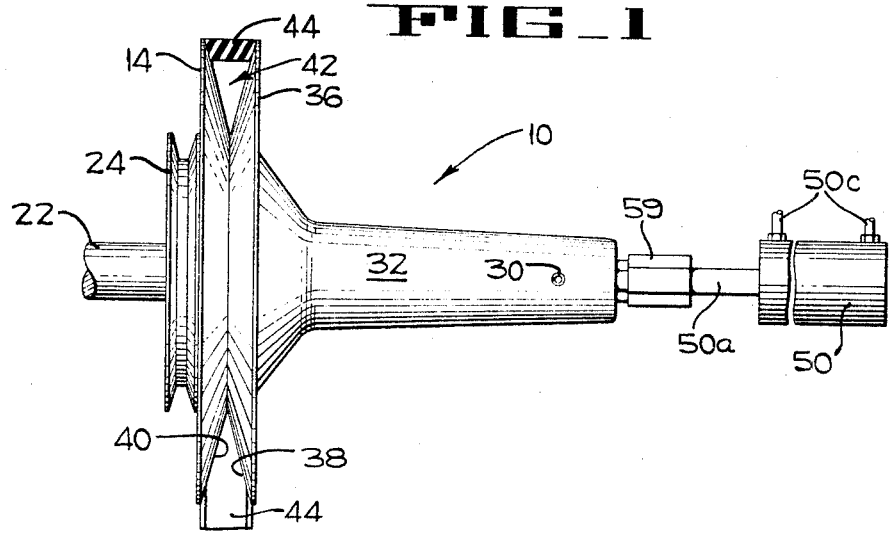
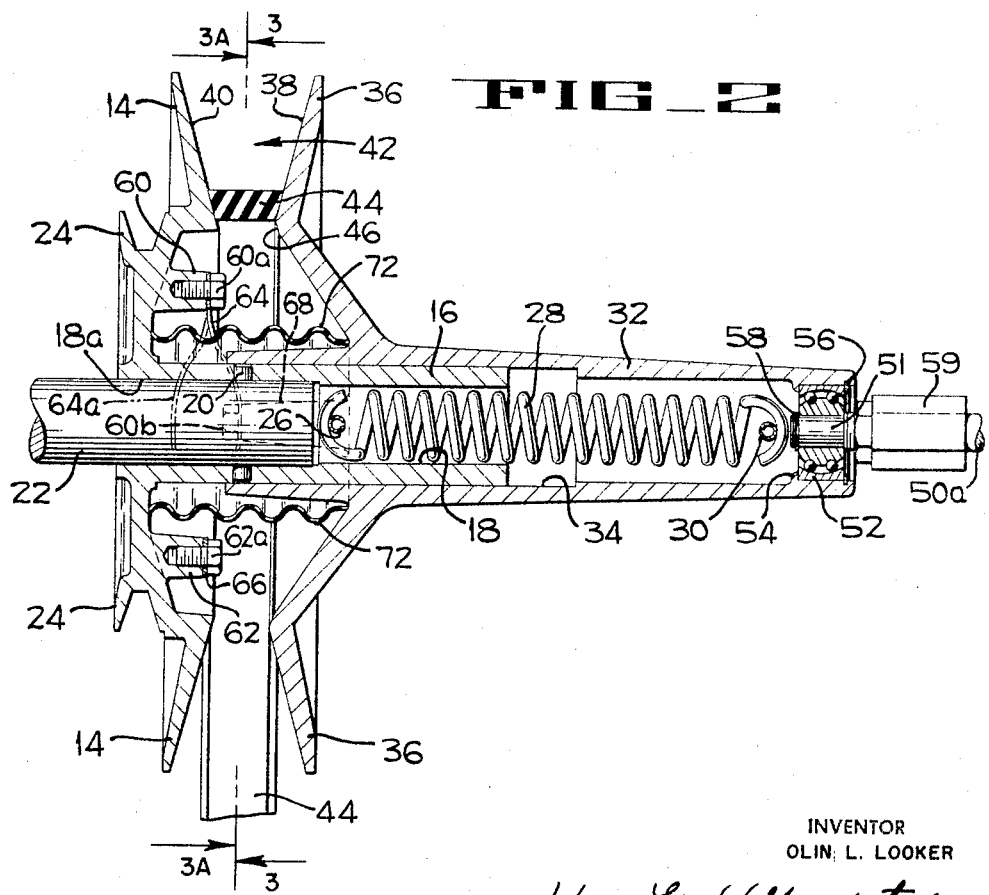
INVENTOR
OLIN L. LOOKER
BY Hans G. Hoffmeister
ATTORNEY

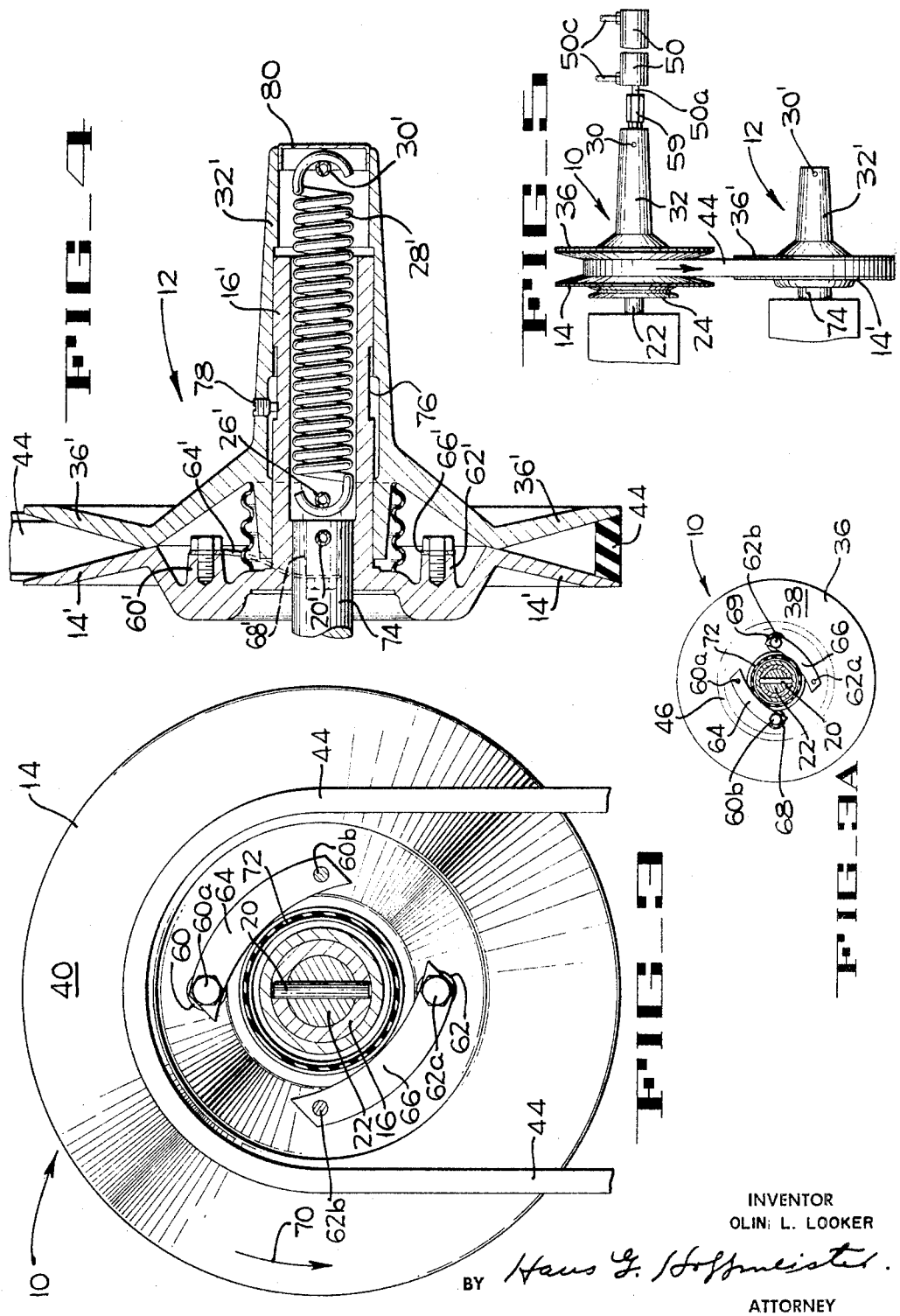

United States Patent Office 3,269,201
Patented August 30, 1966

3,269,201
VARIABLE SPEED DRIVE
Olin L. Looker, Stockland, Ill., assignor to FMC Corporation, a corporation of Delaware
Filed June 5, 1964, Ser. No. 372,935
5 Claims. (Cl. 74—230.17)

The present invention pertains to a belt transmission of the type having an expansible pulley which varies in effective pitch diameter and is driven by engagement with the edges of a V-belt.

Power transmissions of the belt type have numerous applications with many types of low speed vehicles and mechanisms such as agricultural harvesters, mowers, garden tractors, tillers and so forth. In these environments the transmission, unless it is fully shrouded or enclosed is often subjected to dust, mud, debris and water. All of these conditions tend to interfere with free pitch adjustment movement of the pulley. Further, some present belt transmissions are costly to manufacture because they require splined or square bores and shafts, keys and keyways, or other relatively expensive and intricate means to assure simultaneous rotation of the two sheave halves comprising the pulley.

The belt transmission of the present invention is a self contained unit substantially sealed against the intrusion of foreign matter that might otherwise interfere with its operation, and employs novel internal structure which eliminates many expensive machining operations necessary in the manufacture of ordinary belt transmissions. It is a feature of the invention that the two sheave halves are urged together by an internal spring that is inside of their hubs. This makes possible a large area bearing between the sheaves without lengthening the over-all axial dimension of the unit.

An object of the present invention is to provide an improved variable ratio belt transmission which is inexpensive to manufacture.

Another object of this invention is to provide a belt transmission which is substantially sealed to prevent the intrusion of dirt and to preclude the escape of lubricant.

A further object is to provide a belt transmission which does not require splines, square shafts or the like to prevent relative rotation between its sheaves.

It is also an object to reduce the thrust load on a thrust bearing that transmits operating force to the driving unit of the transmission.

Other objects and advantages of the present invention will become evident from the following description and from the accompanying drawings, wherein:

FIGURE 1 is a side elevation of the belt transmission of the present invention coupled to a driven shaft.

FIGURE 2 is an enlarged longitudinal section through the transmission shown in FIGURE 1, and in a different operational position providing the minimum pitch diameter for the drive belt.

FIGURE 3 is a vertical section taken along lines 3—3 of FIGURE 2 and particularly illustrates linkage which interconnects the two sheave halves for simultaneous rotation while accommodating relative axial movement therebetween.

FIGURE 3A is a vertical section taken along lines 3A—3A of FIGURE 2, and is at a reduced scale.

FIGURE 4 is a longitudinal section through a modified form of the transmission shown in FIGURE 2.

FIGURE 5 is an elevation illustrating a drive train including the transmissions shown in FIGURES 2 and 4.

As is customary in most variable speed belt transmission arrangements, the transmissions are usually used in pairs, one a driving transmission coupled to a power source, and the other a driven transmission mounted on a driven shaft and connected by a belt to the driving transmission. In the present instance, the transmission 10 (FIG. 1) is the driving transmission and the transmission 12 (FIGS. 4 and 5) is the driven transmission. Both transmissions 10 and 12 embody common novel features to be subsequently described in detail.

The driving transmission 10 (FIGS. 1 and 2) includes a generally frusto-conical disc or sheave half 14 which is provided with an integral, elongate, cylindrical hub 16 formed with a central bore 18 that is machined out at 18a. A pin 20 locks the hub 16 to a driving shaft 22, the shaft extending into the bore 18a for a sufficient distance to provide an adequate support for the hub and sheave half. An integral part of the sheave half 14 is an accessory drive pulley 24 which is not part of the invention.

The only portions of the hub 16 requiring careful machining are its exterior surface, and the bore section 18a which receives the shaft 22. The hub 16 and the shaft 22 do not have or require interengaging splines, keys and keyways or the like.

Adjacent the end of the driving shaft 22, the hub 16 is provided with diametral apertures in which a pin 26 is pressed for the purpose of anchoring the corresponding end of a tension spring 28 to the hub. The other end of the spring 28 is anchored by a pin 30 to a hub 32. The spring 28 is mounted coincident with the axis of rotation of the transmission, whereby centrifugal force cannot affect the operation of the spring.

A counterbore portion 34 of the hub 32 is slidably fitted on the hub 16 for axial movement thereon. It is to be noted that there are no splines or driving means between the hub 16 and the hub 32 to prevent relative rotation therebetween. Thus, the counterbore 34 is inexpensively machined because it requires only plain cylindrical surfaces.

Integrally formed with the hub 32 is a generally frusto-conical disc or sheave half 36 which has a conical face 38 that cooperates with a similar face 40 of the sheave half 14 to form therebetween a tapered belt receiving groove 42. A conventional V-belt 44 is mounted in the groove 42 in edge-surface contact with the sheave faces 38 and 40. The effective pitch diameter of the belt 44 is variable according to the interspacing of the sheaves 14 and 36; the minimum pitch diameter of the belt occurs when the sheave half 36 is in its FIGURE 1 position, in which position a circumferential shoulder 46 (FIG. 2) of the sheave half 36 abuts the corresponding radially inner portion of the face 40 on the sheave half 14.

The sheave half 36 is held in its widely spaced FIGURE 2 position from the sheave half 14 by a double acting hydraulic ram 50, and is urged toward its closely spaced FIGURE 1 position from the sheave half 14 by both the ram 50 and the tension spring 28. Thus, a stud 51 is mounted coaxial with the hub 32 and one end of the stud is disposed within a self-aligning ball bearing 52 that assumes both radial and axial thrust. The outer race of the bearing 52 is held in the hub between a flange 54 and a snap ring 56. The stud 51 is provided with a snap ring 58 that abuts the inner race of the bearing and the other end of the stud is threaded into a nut 59 that is mounted on the end of the piston rod 50a of the ram 50. Conventional hydraulic controls, not shown, are associated with the ram conduits 50c to adjust and maintain the axial position of the piston rod 50a, and the fully retracted position of the piston rod is such that the sheave half 36 is not moved away from the sheave half 14 far enough to cause the belt groove 42 to become larger than the belt 44.

Because the belt 44 effects rotation of the sheave halves 14 and 36 only by edge engagement with the sloping end surfaces 38 and 40, it is necessary that the sheave halves 14 and 36 be rotationally coupled to obtain maximum driving effort. In accordance with the present invention, this coupling of the sheave halves is accomplished without requiring expensive machined interconnections.

The sheave half 14 (FIGS. 2 and 3) is provided with diametrically opposed, axially inwardly projecting bosses 60 and 62. The bosses 60 and 62 are each provided with a threaded aperture receiving bolts 60a and 62a, respectively, which bolts each anchor one end of an associated arcuate driving links 64 or 66. Links 64 and 66 are formed from thin spring steel, and the link 64 has its other end portion secured by a bolt 60b to an inwardly projecting boss 68 (FIG. 2) that is a part of the sheave half 36. Similarly, the link 66 has its other end portion secured by a bolt 62b (FIG. 3) to a boss 69 (FIG. 3A) that is also part of the sheave half 36 and is diametrally opposed to the boss 68. These flat links lie substantially in a radial plane, although their ends may be offset in operation, by relative axial movement between the sheave halves. In the present embodiment of the invention, the sheave half 14 is driven in the direction of the arrow 70. Thus, the bolts 60b and 62b trail the bolts 60a and 62a when the sheave half 14 is driven, and the links 64 and 66 act as tension members and exert a positive pull upon the sheave half 36, whereby the sheave portions 14 and 36 are driven in synchronism.

Due to the transverse flexibility of the driving links 64 and 66, variations in the interspacing of the sheave halves 14 and 36 is readily accomplished under control of the hydraulic ram 50 while the sheave halves are being driven. Since the belt 44 tends to expand or contract circumferentially in the area of its pitch diameter due to wedge shape, it finds its own level relative to the sheave halves 14 and 36; all in accordance with the well known operating principles of variable pitch belt transmissions.

While the sheave halves 14 and 36 are being adjusted, the circumferential bolt-to-bolt spacings will change slightly due to the transverse flexure of the driving links. However, this change is of no consequence because it merely turns one sheave half very slightly relative to the other without appreciably affecting the spacing of the sheave halves, and hence without affecting the transmission ratio.

The ends of the bosses 60, 62, 68 and 69 are so positioned to minimize the flexural strain on the driving links 64 and 66. Thus, the link 64 (FIG. 2) in being laterally flexed to the phantom line position 64a corresponding to the maximum pitch diameter of the belt 44, moves an equal distance at each side of a plane which includes the axially fixed end of the link.

The driving links 64 and 66 (FIG. 3) are of arcuate shape so as to provide sufficient clearance between their inner edges and the periphery of the hub 32 to mount a neoprene bellows 72. The radius of curvature of these links is greater than that of the bellows 72, so that the links clear the bellows, but still can withstand the tension forces imparted to them during driving, without straightening out. This radius of curvature exceeds that of the link attaching bolts. The bellows is held in slight compression between the sheaves 14 and 36, and encloses the relatively sliding parts of the hubs 16 and 32 which would otherwise be affected by the intrusion of dirt that could interfere with free relative axial movement between the hubs. Also, the links can be packed with lubricant and require no further attention during the life of the unit.

Because the driven transmission 12 (FIG. 4) parallels the construction of the transmission 10, the same reference numerals with a prime suffix will be used for the parts of tranmission 12 which correspond to those of the transmission 10.

A sheave half 14' is provided with a hub 16' which is secured to a driven shaft 74 by a pin 20'. The hub is provided with a peripheral groove 76 intermediate its length. A stop screw 78 is threaded through the outer hub 32' and the inner end of the screw projects into the groove 76 to limit axial movement of the hub 32' on the hub 16'. The outer end of the hub 32' terminates adjacent a pin 30' that anchors a spring 28' and is closed by a friction-held cap 80 to seal out foreign matter and to seal in lubricant. The other end of the spring 28' is held by a pin 26' to the hub 16'.

The hub 32' is integral with a sheave half 36', which is provided with a boss 68' and a diametrally opposed boss, not shown, that are angularly offset from bosses 60' and 62' that are formed on the sheave half 14'. Flexible spring driving links 64' and 66' interconnect the bosses of the two sheave halves 14' and 36' in the same manner as their counterparts in the driving transmission 10.

The spacing of the units 10 and 12, or the length of the belt 44 is such that when the two transmissions 10 and 12 (FIG. 5) are mounted upon their respective shafts, the belt loop is only long enough to form the maximum pitch diameter at one transmission and the minimum pitch diameter at the other transmission. Thus, if the driving transmission 10 is adjusted by actuating the ram 50 to cause the sheave halves 14 and 36 to separate the maximum amount, the belt will assume its minimum pitch diameter around them. Tension of that portion of the belt which is trained around the sheave halves 14' and 36', accordingly, is relaxed, and the spring 28' in the driven unit 12 brings sheave half 36' toward sheave half 14', whereby the belt assumes the maximum pitch diameter of the driven transmission 12, and the driven shaft 74 rotates at its slowest speed.

The springs 28 and 28' (FIGS. 2 and 4) have the same spring rate and the same unstressed length. Accordingly, if the ram 50 were disconnected from the driving transmission 10 (FIG. 5) and the transmission placed in operation, the forces of the two springs would balance out until the belt 44 assumed a 1 to 1 ratio.

To increase the speed of the driven shaft 74, the ram 50 is actuated to extend its piston rod, whereby the ram assisted by the spring 28, forces the axially movable sheave half 36 toward the axially fixed sheave half 14. The sheave halves 14 and 36 are thereby moved together and the corresponding section of the belt expands to a larger pitch diameter. In so doing, the other looped end of the belt is pulled toward the center of the sheave halves 14' and 36', thus causing the belt to further move sheave 36', and the belt assumes a smaller pitch diameter.

Meanwhile, the driving links 64, 66 and 64', 66' flex transversely to accommodate relative axial movement between the sheaves of the two transmissions, while at the same time the links positively drive each of the axially movable sheave halves 36 and 36' so that a continuous maximum transfer of power is effected between the two transmissions.

It will be recalled that the springs 28 and 28' interact to center the belt at a 1 to 1 ratio, if no force is applied to the ram. Now, if the driving sheave half 36 were separated from sheave half 14 by the ram by further stretching the spring 28, the spring 28' will pull the driven sheave half 36' in, and some of this force will be transmitted by the belt to the driving unit and assist in separating sheave half 36. Conversely, if the driving sheave half 36' is brought in toward sheave half 14 by the ram, the spring 28 assists in this motion, and thus partially overcomes the resistance of spring 28' in the driven unit, which resists the attendant separation of sheave half 36' caused by pull on the belt. This dual, normally balanced spring and sheave combination reduces the maximum thrust load that must be sustained by the bearing 52, which makes it possible to employ a relatively small bearing that fits within the hub 32.

From the preceding description, it is evident that the variable ratio belt transmissions 10 and 12 can be manufactured at less cost than transmissions which require splined, keyed or non-cylindrical shafts and bores to maintain equal driving engagement of the sheave halves with the associated belt, and yet are efficient in relatively high ranges of power transfer. Further, the transmissions are substantially sealed against the intrusion of foreign matter and against the loss of lubricant, whereby maintenance and wear of the transmissions are minimized.

While a particular embodiment of the present invention has been shown and described it will be understood that the particular details herein set forth are capable of modification and variation without departing from the principles of the invention and that the scope of the invention should be limited only by the scope and proper interpretation of the claims appended hereto.

This invention having thus been described, that which is believed to be new, and for which protection by Letters Patent is desired, is:

1. In a variable ratio belt transmission, two coaxially mounted sheave halves, means mounting said sheave halves for relative axial motion to vary the pitch diameter of a belt trained around the driving faces thereof, an elongate laterally flexible driving link mounted between said sheave halves radially within their driving faces and with its flat faces substantially parallel to the general planes of the sheave halves, and means securing one end portion of said link to one of said sheave halves and the other end portion of said link to the other of said sheave halves for coupling said sheave halves together for simultaneous rotation, said link simultaneously accommodating variations in the interspacing of the sheave halves by lateral flexure.

2. A variable ratio belt transmission comprising two coaxially mounted sheave halves, means mounting said sheave halves for relative axial motion to vary the pitch diameter of a belt trained around their confronting driving faces, a plurality of elongate and laterally flexible driving links, said links being disposed radially within the driving faces of the sheave halves, and means connecting the leading end portion of each link to one of said sheave halves and the trailing end portion of each link to the other of said sheave halves, said links being arcuate and having a radius of curvature that is greater than the radius of a circle passing through said link connecting means.

3. A variable ratio belt pulley comprising two coaxially mounted sheave halves, means mounting said sheave halves for relative axial movement to change the pitch diameter of a belt engaged with their confronting driving faces, a driveshaft, means securing one of said sheave halves to said driveshaft, a flat elongate leaf spring driving link mounted between said sheave halves radially within the driving faces thereof, said spring lying substantially in a radial plane perpendicular to the turning axis of the sheave halves, and means securing the leading end portion of said driving link to the driven one of said sheave halves and the trailing end portion of said link to the other one of said sheave halves, transverse flexure of said link accommodating variations in the interspacings of said sheave halves while maintaining a positive mechanical interconnection of the sheave halves for simultaneous rotation thereof.

4. A variable ratio pulley comprising a cylindrical drive shaft, a first generally frusto-conical sheave half having a hollow cylindrical hub mounted on said shaft for rotation therewith, a second generally frusto-conical sheave half having a hub defining a cylindrical bore surface fitted in axially slidable engagement with the outer surface of the hub of said first sheave half, said first and second sheave halves being mounted with their conical driving surfaces in confronting relation to thereby form a tapered belt receiving groove wherein the pitch diameter of a belt trained therein is variable according to the interspacing of said sheave halves, and a plurality of laterally flexible, substantially longitudinally inextensible driving links mounted radially within the belt driving faces of said sheave halves and each interconnecting said first and second sheave halves, said driving links preventing relative rotation between said sheave halves and accommodating different interspacings of said sheave halves by lateral flexure.

5. A variable ratio belt pulley comprising a first generally frusto-conical sheave half having a hollow cylindrical hub adapted to be secured to a driveshaft, a second generally frusto-conical sheave half having a hub defining a cylindrical bore surface slidably mounted on the exterior hub surface of said first sheave half, said first and second sheave halves being mounted with their conical surfaces in confronting relation to form a tapered belt receiving groove wherein the pitch diameter of a belt trained around the groove is variable according to the interspacing of said sheave halves, the hub of said second sheave half extending axially beyond the corresponding end of the hub of said first sheave half, a tension spring disposed coaxially within said hubs and connected to both hubs for axially moving said second sheave half toward said first sheave half, power means connected to the hub of said second sheave half for axially moving said second sheave half in both axial directions, and an elongate, laterally flexible driving link mounted radially within the driving faces of said sheave halves and having opposite end portions interconnecting said first and second sheave halves, said link preventing relative rotation between said sheave halves and being capable of lateral flexure to accommodate different interspacings of said sheave halves.

References Cited by the Examiner

UNITED STATES PATENTS

| 2,032,585 | 3/1936 | Lewellen et al. | 74—230.17 |
| 2,938,395 | 5/1960 | Hovorka. | |

FOREIGN PATENTS 1,340,277    9/1963    France.

DAVID J. WILLIAMOWSKY, *Primary Examiner.*

L. H. GERIN, *Assistant Examiner.*